3,290,277
AMINO-CONTAINING BLOCK POLYMERS OF ETHYLENE AND α-ALKYL STYRENE
William S. Anderson, Oakland, and Stephen H. Levin, Berkeley, Calif., assignors to Shell Oil Company, New York, N.Y., a corporation of Delaware
No Drawing. Filed May 20, 1963, Ser. No. 281,818
19 Claims. (Cl. 260—88.2)

This invention relates to new and novel amino-containing copolymers of alpha-alkyl styrene and ethylene and to their use as multifunctional materials and in compositions of matter.

It is known that alpha-alkyl styrene can be polymerized in the presence of Friedel-Crafts catalysts, finely divided metallic sodium, peroxides and the like. Polymerization of alpha-alkyl styrene and copolymerization thereof by conventional means as mentioned, results essentially in thermally unstable polymers which are generally brittle and difficult to work as in molding, extruding and the like.

It has now been discovered that an excellent oxidatively stable polymer can be prepared by copolymerizing alpha-alkyl styrene with ethylene in the presence of an organo lithium catalyst and a tertiary amine which functions as a solvent, co-catalyst and reactant. Under certain controlled conditions, amino-containing block polymers can be formed which are composed of (I) one or more blocks each containing 50–100 mol percent of ethylene units and (II) one or more blocks each containing 50–100 mol percent of alpha-alkyl styrene units, and a particular feature of these block polymers is that those which contain 50 mol percent of each monomer is that the sequence of the monomer units within such blocks is the alternating sequence. It is not understood how the amino groups enter the random or block polymers and become an integral part thereof, but it is assumed that they form the terminal ends of the copolymer.

The molecular weight of these novel amino-containing polymers can range as determined by light scattering method from about 5,000 to 1,000,000 or more, preferably between about 10,000 and 600,000 and having a intrinsic viscosity in toluene of from about 0.2 to about 2, preferably from 0.5 to 1.5, and the nitrogen content varies from 0.1% to 1%.

The new and novel amino-containing copolymers of the present invention are prepared by copolymerizing an alpha $C_{1-4}$ alkyl styrene and ethylene in a tertiary amine solvent which in addition functions as a reactant and co-catalyst with an organo lithium catalyst at between $-50°$ C. and $40°$ C., preferably between $-30°$ C. and $30°$ C. In forming the block polymers, the reaction temperature ranges from about minus $100°$ C. and $0°$ C. and at a pressure below 5,000 p.s.i. to form a block containing 50–100 mol percent of an alpha-alkyl styrene then increasing the temperature to between $0°$ C. and $50°$ C. and the pressure to between 5,000 p.s.i. and 100,000 p.s.i. to form blocks containing 50–100 mol percent of ethylene. The pressures and temperatures may be applied in the order given above or may be applied in the reverse sequence; furthermore, the temperatures and pressures may be repeatedly cycled between the ranges given so as to form polymers containing three, four, five or even 100 blocks. The desired changes in pressure can usually be obtained simply by changing the temperature; however, it is also possible to raise or lower pressure by adding or removing solvents or monomers to the reaction mixture.

By alpha-alkyl styrene is meant alpha $C_1$–$C_4$ alkyl styrene such as alpha-methyl styrene, alpha-ethyl styrene, etc.

The tertiary amines which act in a multifunctional manner indicated, namely as solvent, reactant and co-catalyst include liquid tertiary alkylamines and particularly $C_{1-18}$ alkylamines and preferably tertiary $C_{1-4}$ alkylamines or heterocyclic amines. Of the heterocyclic amines, preferred are the ether-containing heterocyclic tertiary amines such as N-alkyl morpholine or N-aryl morpholine, although other 5- and 4-member tertiary heterocyclic amines can be used such as N-alkyl piperidine, N-alkyl pyrrolidine. The tertiary alkyl amines include trimethyl, triethyl, triisopropyl, tributyl, dimethyl ethyl, dimethylbutyl, diethyl methyl, diethyl butyl amines; polyamines, e.g. triethylene diamine, and heterocyclic amines such as N-$C_{1-4}$ alkyl morpholines, e.g. N-methyl or N-ethyl morpholine, N-aryl morpholine, e.g. N-phenyl morpholine, and mixtures thereof. Preferred solvent-reactant-co-catalyst are the $C_{1-4}$ trialkyl amines such as trimethyl or triethyl amines and N-alkyl morpholine, e.g. N-methyl or N-ethyl-morpholine.

The organo lithium catalyst may be alkyl or aryl lithium compound, e.g. ethyl or normal or branched butyl, octyl lithium or phenyl or naphthyl lithium or mixtures thereof. The catalyst may also be a dilithio compound such as lithium adduct of 1,1-diphenyl ethylene, or of stilbene or of alpha-methyl styrene or may also be an aliphatic dilithio compound such as 1,5-dilithio pentane, 1,6- dilithio hexane, etc.

When other types of catalysts such as the Friedel-Crafts catalysts or Ziegler type catalyst or other alkali metal catalysts, e.g. sodium or mixtures thereof with or without the presence of conventional solvents such as liquid hydrocarbon, e.g. heptane, etc. and under different pressure and temperature conditions from that of the present invention results in a different end product from the one made by the process of the present invention. Particular advantages of amino-containing block copolymers of alpha-methyl-styrene/ethylene of the present invention is their surface activity either as the free base or as the quaternary ammonium salts of hydrochloric, hydrobromic or sulfuric acid.

The following examples are illustrative of the present invention.

EXAMPLE I

A 300 ml. of stainless steel autoclave with magnetically driven agitator was charged with 50 ml. of N-methyl morpholine and 7.0 ml. butyl lithium (0.6 molar in heptane). The autoclave was purged with nitrogen, then with ethylene. Ethylene was added until the pressure in the autoclave reached 325 p.s.i.g.; the ethylene valve was then closed. A solution of alpha-methyl styrene in N-methyl morpholine was then pumped into the autoclave over a period of two hours. Reactor temperature 18–21° C. During addition of alpha-methyl styrene solution, the ethylene pressure dropped to 265 p.s.i.g. Ethylene pressure was then raised to 340 p.s.i.g. and the mixture was agitated for 19 hours at 16–22° C. Finally, ethylene was vented, 5 ml. methanol was added to destroy the butyl lithium and the polymer solution was evaporated at 75°/1 mm. The residue was dissolved in benzene, filtered, reprecipitated twice in methanol and vacuum dried. The end product was a copolymer of ethylene and alpha-methyl styrene containing N-methyl morpholine groups in the polymer.

Following the above procedure other copolymers of the present invention were prepared as shown in Table I.

Table I

| Example [1] | Reaction Temperature | Reaction Pressure | Copolymer Composition Mol Percent of Components | | Intrinsic Viscosity in Toluene, 25° C. |
|---|---|---|---|---|---|
| | | | Alpha-methyl styrene | Ethylene | |
| IB | 20 | 300 p.s.i. | 33 | 57 | 0.2 |
| IC | 2 | 200 p.s.i. | 39 | 61 | 0.1 |
| ID | −10 | 1 atom. | 66 | 34 | 0.1 |
| IE | −20 | do | 73 | 27 | 0.6 |
| IF | −10 | do | 70 | 30 | 0.2 |
| IG | 20 | 12,000 p.s.i.g. | 20 | 80 | 0.8 |
| IH | 10 | 30,000 p.s.i.g. | 15 | 85 | 1.0 |

[1] B and C solvent-co-reactant=trimethylamine, catalyst=butyl lithium.
 D and E solvent-co-reactant=mixture of N-methyl morpholine-triethylene diamine, catalyst=butyl lithium.
 F solvent-co-reactant=triethylamine, catalyst=octyl lithium.
 G solvent-co-reactant=N-ethyl morpholine, catalyst=butyl lithium.
 H solvent-co-reactant=triethylene diamine, catalyst=butyl lithium.

Copolymers of Examples IA–IH can be modified by forming hydro-chloride salts which products are excellent surface active agents and also can be used as emulsifiers to form water-oil emulsions for use in metal working and the like. The hydrochloride modified copolymers, e.g. IA–IH function as detergents for lubricating oils. Copolymers IA–IH are also active as detergents for lubricating oils as the free base.

EXAMPLE IIA

About 1:1 mol ratio of alpha-methyl styrene and ethylene was introduced into a stainless steel autoclave with a magnetically driven agitator conataining N-methyl morpholine solvent-reactant and about 0.01% butyl lithium catalyst and the mixture reacted at 0° C. and 30,000 p.s.i. for about 1 hour to form copolymer having alternating units of alpha-methyl styrene-ethylene which has a molecular weight of 50,000. At this point the reaction temperature was dropped to between −50 and −80° C. and the reaction continued for 24 hours. Block units of alpha-methyl styrene formed and the final block copolymer was polymer having a molecular weight of 80,000–100,000.

Following the procedure of Example IIA the following other block copolymers were prepared as shown in Table II.

Table II

| Example | First Stage Pressure, p.s.i. | First Stage Temperature, °C. | Second Stage Pressure, p.s.i. | Second Stage Temperature, °C. | Polymer Composition | | |
|---|---|---|---|---|---|---|---|
| | | | | | Percent Ethylene | Percent α-methyl styrene | Intrinsic Visc. in Toluene, 25° C., End Product |
| IIB Ethylene/α-methyl styrene | 30,000 | +20 | Atm. | −40 | 60 | 40 | 0.2 |
| IIC Ethylene/α-methyl styrene | 40,000 | +30 | 3,500 | −40 | 50 | 50 | 0.5 |
| IID Ethylene/α-methyl styrene | 50,000 | +50 | Atm. | −50 | 40 | 60 | 0.8 |
| IIE Ethylene/α-methyl styrene | 30,000 | +10 | Atm. | −70 | 50 | 50 | 0.1 |
| IIG Ethylene/α-methyl styrene | 30,000 | 0 | Atm. | −35 | 50 | 50 | 0.15 |

IIB solvent-co-reactant-catalyst=N-methyl morpholine, catalyst=butyl lithium.
IIC solvent-co-reactant-catalyst=mixture (50/50) trimethylamine and triethylene diamine, catalyst=butyl lithium.
IID solvent-co-reactant-catalyst=N-ethyl morpholine, catalyst=lithium biphenyl.
IIE solvent-co-reactant-catalyst=triethylamine, catalyst=naphthyl lithium.
IIG solvent-co-reactant-catalyst=methyl morpholine, catalyst=lithium naphthalene.

EXAMPLE IIIA

In a stainless steel autoclave a 10:1 mol ratio of ethylene and alpha-methyl styrene were charged and reacted in N-methyl morpholine solvent-co-reactant and butyl lithium catalyst at −50 to 80° C. and 3,000 p.s.i.g. pressure for 1 hour to form a 10,000 molecular weight alpha-methyl styrene polymer. The reaction temperature was then increased to 30–35° C. and the pressure adjusted to 30,000 p.s.i.g. and the reaction was continued under agitation for about 24 hours. The polymer consisted of a block of alpha-methyl styrene units attached to a block of alternating ethylene 10 and alpha-methyl styrene units and containing N-methyl morpholine in the copolymer. Its molecular weight was 50,000.

Following the procedure of IIIA the following amino-containing block copolymers were prepared as shown in Table III.

Table III

| Example | First Stage Pressure, p.s.i. | First Stage Temperature, °C. | Second Stage Pressure, p.s.i. | Second Stage Temperature, °C. | Polymer Composition | | |
|---|---|---|---|---|---|---|---|
| | | | | | Percent Ethylene | Percent α-methyl styrene | Intrinsic Visc. in Toluene, 25° C., End Product |
| IIIB Ethylene/α-methyl styrene | Atm. | −35 | 30,000 | 50 | 50 | 50 | 0.12 |
| IIIC Ethylene/α-methyl styrene | 400 | −50 | 40,000 | 10 | 40 | 60 | 0.5 |
| IIID Ethylene/α-methyl styrene | 400 | −70 | 50,000 | 0 | 30 | 70 | 0.8 |

IIIB solvent-co-reactant-catalyst=N-methyl morpholine, catalyst=lithium diphenylethylene.
IIIC solvent-co-reactant-catalyst=trimethylamine, catalyst=octyl lithium.
IIID solvent-co-reactant-catalyst=N-ethyl morpholine, catalyst=butyl lithium.

The quaternary ammonium salts of the present invention are prepared by dispersing the amino-containing copolymers as described above in an inert hydrocarbon solvent such as benzene, toluene, heptane, etc. and reacting said mixture with dilute inorganic acids, e.g. hydrochloric, hydrobromic or sulfuric acid to form the corresponding chlorides, bromides or sulfates. These salts are excellent surface active agents and are useful in making emulsions for industrial uses such as in metal working, hydraulic fluids, lubricants and the like.

EXAMPLE $A_1$

The copolymer of Example IH was dispersed in benzene and admixed with an aqueous solution of hydrochloric acid while stirring and gently heating the mixture for about 2–4 hours. The quaternary ammonium salt was recovered, washed and dried. The produced possessed excellent dispersant properties when 0.5% of it was dispersed in mineral oil when the oil composition was subject to the carbon black test. This test comprises dispersing 0.2% carbon black in the test composition and subjecting it to shaking in a shaking machine for 5 minutes and thereafter noting the time required for the first appearance of agglometration of the carbon black particles. Neat mineral oil containing 0.2% carbon black subjected to this test showed carbon agglomeration in about 3 minutes whereas the same oil composition containing 0.5% Example $A_1$ salt showed no sign of carbon settling even after 5 days. The copolymer IH as the free base rather than the hydrochloride is also active as a dispersant in the same test.

Amino-containing random or block copolymers of the present invention possess new and novel properties. Thus, amino-containing copolymers IA, IIA and IIIA are oxidation resitant. At 150° C., oxidation of these amino-containing copolymers by air after 40 hours was undetectable whereas ethylene propylene copolymer and isoprene/α-methyl styrene copolymers were badly degraded by this treatment. Also, amino-containing copolymer IA, IIA and IIIA when heated as a thin film for 135 hours at 200° C. turned yellow. Polyethylene (M.W. 6000) and polyisobutylene (10–12,000) films heated under these conditions completely discolored at 1–2 and 5–10 hours, respectively.

Amnio-containing copolymers IA, IIA and IIIA when subjected to irradiation with 3 mev. electrons at 25° C. required for gelation a dose 100 times larger than that required for polyethylene.

Alternating copolymers of the present invention are optically transparent whereas random polymerized ethylene/α-methyl styrene copolymers are not.

A shortcoming of thermoplastics made from poly-alpha-methyl styrene hompolymer is their thermal instability. At the temperatures required for molding or extruding, or in fact at any temperature greater than about 200° C., poly-alpha-methyl styrene decomposes to the monomer. By copolymerizing alpha-methyl styrene with ethylene as described this decomposition is retarded making it possible to mold or extrude objects at higher temperatures and therefore at higher rates than are possible when using poly-alpha-methyl styrene.

A drawback of alpha-methyl styrene polymers prepared for use as plastics (for example, those prepared according to U.S. 2,621,171, 2,658,058 and 2,507,338) is their brittleness. Amino-containing copolymerization of ethylene with alpha-methyl styrene prepared by the methods described in the present application removes this deficiency. For example, a poly-alpha-methyl styrene piece ¼″ x ¼″ x 1½″ breaks easily when dropped on a hard surface from a height of two feet. Amino-containing copolymers IA or IIA of the present invention are tough, solids which do not break even when thrown against a hard surface. Thermogravimetric data demonstrating the superior thermal stability of ethylene-alpha-methyl styrene copolymers over other types of polymers are shown in Table IV.

Table IV [1]

| | 5% wt. loss, ° C. | 10% wt. loss, ° C. | 15% wt. loss, ° C. |
|---|---|---|---|
| Poly-alpha-methyl styrene | 215 | 325 | 340 |
| Poly-methyl-methyacrylate | 250 | 272 | 285 |
| Polyisobutylene | 285 | 300 | 303 |
| Copolymer isoprene/alpha-methyl styrene | 321 | 332 | 341 |
| Example IA amino-containing copolymer | 370 | 393 | 398 |
| Example IIA amino-containing copolymer | 393 | 410 | 415 |
| Example IB amino-containing copolymer | 371 | 385 | 395 |

[1] Polymers heated under 50 ml./min. of nitrogen, at 25° C./minute. Figures in wt. loss column are T, ° C. required to reach the indicated wt. losses.

The VI properties of oils can be improved by incorporating therein from 0.1% to 5% amino-containing copolymers of the present invention. Thus, addition of 1% of copolymers IH or IIA to a mineral oil (VI=70) increased the viscosity index to around 120.

Amino-containing copolymers of the present invention are compatible with waxes, rubber (natural and synthetic), moldable resins, ion exchange resins and can be used in radiation resistant oils, greases, plastics, dielectrics, optical goods, synthetic leather, drilling muds, lubricants and the like.

We claim as our invention:

1. A process for producing high molecular weight amino-containing copolymer of ethylene and alpha-$C_{1-4}$ alkyl styrene obtained by reacting the monomers of ethylene and alpha-methyl styrene in a tertiary amine solvent-co-reactant and an organo lithium catalyst, said copolymer having a molecular weight in the range of from 6000 to 800,000.

2. A process for producing high molecular weight amino-containing copolymer of ethylene and alpha-methyl styrene obtained by reacting the monomers ethylene and alpha-methyl styrene in the presence of a tertiary heterocyclic amine solvent-co-reactant and an alkyl lithium catalyst, said copolymer having a molecular weight in the range of from 25,000 to 500,000.

3. A process for producing high molecular weight amino-containing copolymer of ethylene and alpha-methyl styrene obtained by reacting the monomers ethylene and alpha-methyl styrene in the presence of N-alkyl morpholine solvent-co-reactant and butyl lithium, said copolymer having a molecular weight in the range of from 25,000 to 500,000.

4. A process for producing high molecular weight amino-containing copolymer of ethylene and alpha-methyl styrene obtained by reacting the monomers ethylene and alpha-methyl styrene in the presence of trialkylamine solvent-co-reactant and butyl lithium catalyst, said copolymer having a molecular weight in the range of from 25,000 to 500,000.

5. A N-methyl morpholine-containing polymer prepared by the process of claim 1.

6. A trimethylamine-containing polymer prepared by the process of claim 1.

7. A process for producing high molecular weight amino-containing block copolymers of alpha-$C_{1-4}$ alkyl styrene and ethylene composed of one or more blocks, each containing 50–100 mol percent of ethylene units and one or more blocks each containing 50–100 mol percent of alpha-$C_{1-4}$ alkyl styrene such block polymers being prepared by copolymerizing ethylene and alpha-alkyl styrene in a mol ratio between 1:10 and 10:1 in a tertiary amine solvent-co-reactant and with an organo lithium catalyst at a temperature between 0° C. and 50° C. and a pressure between 5,000 and 100,000 p.s.i. for a period of time and for another period of time between −100°

C. and 0° C. and at a pressure below 5,000 p.s.i., the resulting amino-containing polymer having a molecular weight of from 6,000 to 800,000.

8. A process for producing high molecular weight amino-containing block copolymers of alpha-$C_{1-4}$ alkyl styrene and ethylene having in the center of the macromolecule a block containing 50–100 mol percent of alpha-$C_{1-4}$ alkyl styrene units and at the ends of the macromolecule a block containing 50–100 mol percent of ethylene such block polymers being prepared by copolymerizing ethylene and alpha-$C_{1-4}$ alkyl styrene in a mol ratio between 1:10 and 10:1 in a tertiary amine solvent-co-reactant and with an organo lithium catalyst at a temperature between −100 and 0° C. and at a pressure below 5,000 p.s.i. then increasing the temperature to between 0 and 50° C. and a pressure between 5,000 and 100,000 p.s.i., the resulting amino-containing block polymer having a molecular weight of from 6,000 to 500,000.

9. A process for producing high molecular weight block copolymers of alpha-$C_{1-4}$ alkyl styrene and ethylene having in the center of the macromolecule a block consisting of alternating units of ethylene and alpha-$C_{1-4}$ alkyl styrene and at the ends of the macromolecule blocks consisting of alpha-methyl styrene units, such block polymers being prepared by copolymerizing ethylene and alpha alkyl styrene in a mol ratio between 1:10 and 10:1 in a tertiary heterocyclic amine solvent-co-reactant and with a difunctional organo lithium catalyst at a temperature between 0 and 50° C. and a pressure between 5,000 and 100,000 p.s.i. and then decreasing the temperature to between −100° C. and 0° C. and decreasing the pressure to below 5,000 p.s.i. the resulting amino-containing block polymer having a molecular weight of from 6,000 to 500,000.

10. A process for producing high molecular weight block copolymers of alpha-$C_{1-4}$ alkyl styrene and ethylene having in the center of the macromolecule a block consisting of alpha-alkyl styrene units and at the ends blocks consisting of alternate units of ethylene and alpha alkyl styrene such block polymers being prepared by copolymerizing ethylene and alpha alkyl styrene in a mol ratio between 1:10 and 10:1 in N-alkyl morpholine solvent-co-reactant and with a difunctional organo lithium catalyst at a temperature between −100° and 0° C. and the pressure below 5,000 p.s.i. then increasing the temperature to between 0 and 50° C. and the pressure to between 5,000 p.s.i. and 100,000 p.s.i. the resulting N-alkyl morpholine-containing block copolymer having a molecular weight of from 6,000 to 500,000.

11. A N-methyl morpholine-containing block polymer prepared by the process of claim 7 in which the solvent-co-reactant is N-methyl morpholine and the alpha-alkyl styrene is alpha-methyl styrene.

12. A trimethylamine-containing block polymer prepared by the process of claim 7 in which the solvent is trimethylamine and the alpha alkyl styrene is alpha-methyl styrene.

13. A N-ethyl morpholine-containing block polymer prepared by the process of claim 7 in which the catalyst is the lithium adduct of 1,1-diphenyl ethylene and the solvent-co-reactant is N-ethyl morpholine and the alpha-alkyl styrene is alpha-methyl styrene.

14. A process for producing high molecular weight quaternary ammonium salt of the product of the copolymer of claim 1 by reacting said copolymer in an inert solvent with an inorganic acid selected from the group consisting of hydrochloric, hydrobromic and sulfuric acids.

15. A process for producing high molecular weight quaternary ammonium salt of the product of the copolymer of claim 7 by reacting said copolymer in an inert solvent with an inorganic acid selected from the group consisting of hydrochloric, hydrobromic and sulfuric acids.

16. An oleaginous composition containing a small amount of the amino-containing copolymer prepared by the process of claim 1.

17. An oleaginous composition containing a small amount of the amino-containing copolymer prepared by the process of claim 7.

18. A plastic composition containing a small amount of the amino-containing copolymer prepared by the process of claim 1.

19. A plastic composition containing a small amount of the amino-containing copolymer prepared by the process of claim 7.

References Cited by the Examiner
UNITED STATES PATENTS

| | | | |
|---|---|---|---|
| 3,055,878 | 9/1962 | Janoski | 260—94.6 |
| 3,165,503 | 1/1965 | Kahne et al. | 260—94.6 |

OTHER REFERENCES

Chem. Abs., vol. 56, p. 2551b.
Chem. Abs., vol. 57, p. 8716h.

JOSEPH L. SCHOFER, *Primary Examiner.*

JAMES A. SEIDLECK, *Examiner.*

L. EDELMAN, *Assistant Examiner.*